(12) United States Patent
Mei et al.

(10) Patent No.: US 6,484,250 B1
(45) Date of Patent: Nov. 19, 2002

(54) HASH TECHNIQUE ELIMINATING POINTER STORAGE TO REDUCE RAM SIZE

(75) Inventors: Yousong Mei, San Diego, CA (US); Eric John Lekven, Calsbad, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/487,948

(22) Filed: Jan. 19, 2000

(51) Int. Cl.[7] .............................................. G06F 12/00
(52) U.S. Cl. ...................................................... 711/216
(58) Field of Search ................................ 711/103, 202, 711/216

(56) References Cited

U.S. PATENT DOCUMENTS 5,944,781 A * 8/1999 Murray ......................... 707/10
6,044,079 A * 3/2000 Calvignac et al. ........... 370/230
6,324,637 B1 * 11/2001 Hamilton ..................... 711/216

* cited by examiner

Primary Examiner—Kevin Verbrugge
(74) Attorney, Agent, or Firm—Philip R. Wadsworth; Charles D. Brown; Kevin T. Cheatham

(57) ABSTRACT

A method and apparatus for reducing the amount of RAM required while maintaining fast data access. Data records are often saved in nonvolatile memory in order to maintain the contents of the data records even when the circuit is powered down. In the present invention each record in the nonvolatile RAM collection of data records is input to a function H(x) that outputs a tag value. The calculated tag value is saved in predetermined memory locations in RAM. Each calculated tag is shorter in length than the record saved in nonvolatile RAM. Therefore less RAM is required to save one tag value for each data record than is required to save the entire collection of data records in RAM. The value of H(y) is calculated when a data record entry corresponding to y is desired. Then the value of H(y) is compared to all the values in the tag value table. If a match is found, the corresponding record from its location in non-volatile RAM is retrieved and compared to y. If the values do not match the tag value table is searched for another location matching H(y). The result is a very fast comparison with the contents of non-volatile RAM requiring only a minimal amount of RAM.

13 Claims, 3 Drawing Sheets

HASH TECHNIQUE ELIMINATING POINTER STORAGE TO REDUCE RAM SIZE

BACKGROUND OF THE INVENTION

I. Field of the Invention

The present invention relates to electronic circuits. More particularly, the present invention relates to a novel and improved method and apparatus for reducing the RAM requirement in a device while maintaining fast look up and retrieval of data from slow non-volatile memory.

II. Description of the Related Art

Electronic memory of some type is used in almost all modem electronic devices. Electronic memory can take the form of floppy discs, magnetic tape, hard discs, and integrated circuits (IC). Each form of memory has its advantages and disadvantages. Floppy discs allow numerous data updates on a portable medium but have limited capacity and extremely long read and write access times. Both magnetic tape and hard discs have the capability for enormous capacity but are not portable, require large amounts of support hardware, and have slow read and write access times. Data saved in floppy disc, hard disc, and magnetic tape is often first formatted in software to a file format prior to saving on the medium. When data is recovered from the storage medium the software file routine must be run to locate and extract the requested data. This further slows the data access process because it adds a software layer on top of the already slow hardware access.

IC memory is typically used where memory needs to be integrated into a portable device. Varying the type and number of ICs can scale the amount of memory. ICs require minimum support hardware, are extremely small, and can provide fast read and write access times. Some IC memory can easily support direct access without the need for a software layer.

Numerous different types of IC memory are available to provide solutions to various design requirements. Each type of memory is able to satisfy a number of design requirements, but no one memory type is able to provide a complete design solution. The type of memory chosen for any particular application will depend on planned usage and performance design trade-offs.

The most common type of IC memory is Read Only Memory (ROM). As the name implies, the memory is only read accessible. A ROM device cannot be rewritten once it has been programmed. Embedded software applications use ROM to store embedded code and data records. The processor in an embedded software application retrieves each instruction from ROM and executes it. Different types of ROM are available depending on the volatility of the information to be programmed within the ROM. If the information to be stored in ROM is not expected to change and the expected volume of devices is high then mask programmable ROM is used. This type of ROM is mask programmed prior to packaging of the die. The information to be programmed must be highly stable and not subject to revision since changes in the programmed information require a mask change. The benefits of using mask programmed ROM relate to cost and time savings for high volume, mature products. Other types of ROM are available for products that do not sustain production volumes or code stability sufficient to justify mask programmed ROM.

Programmable Read Only Memory (PROM) allows the device manufacturer to program the embedded code. This allows for revisions in the code but still does not allow for modification or erasure of the ROM once it has been programmed. Devices that have been programmed with an out of date code revision will either need to be used with the out of date code revision or will need to be discarded.

Erasable Programmable Read Only Memory (EPROM) provides the ability to completely erase a programmed part. Erasure of an EPROM is accomplished by exposing the die to ultraviolet (UV) light for a predetermined period of time. The die can be exposed to the UV light through a transparent window on the EPROM package. Once erased, the EPROM can be reprogrammed. EPROMs are typically only used for engineering development where the expected number of code revisions is high. The limitations on the package type that can accommodate the transparent window contribute to the much higher price of an EPROM when compared to a PROM. Although the EPROM can be erased and reprogrammed, modifications to the code must be done on a complete chip basis. Even changes to a single bit within the code require complete erasure and reprogramming. This limitation, along with the requirement for a UV light for erasure confine the task of updating EPROMs to original equipment manufacturers (OEMs).

A device that allows for selective content erasure and reprogramming is the Electrically Erasable Programmable Read Only Memory (EEPROM). Conventional EEPROM allows for data to be updated in place. That is, a particular data location can be erased and new data overwritten in the same location. Data can be read from an EEPROM quickly but the write cycle of the conventional EEPROM can be orders of magnitude longer than the read time. Another disadvantage of using a conventional EEPROM arises from the inherent structure of the conventional EEPROM cell. The structure of a conventional EEPROM cell requires more transistors than in a standard PROM. The increased structure results in reduced memory capacity and increased cost. These disadvantages make usage of conventional EEPROM prohibitive in most consumer electronics applications.

Random Access Memory (RAM) represents another alternate means for storage. RAM allows for selective data reads and writes. Read and write can be performed on a byte basis. No erase cycle is required before writing new data to a previously written byte. Moreover, unlike the EEPROM, the read and write cycle times of the RAM are nearly identical. The density and capacity of RAM is comparable to ROM. The major disadvantage in using RAM is the volatile nature of the stored data. Information stored in RAM is lost whenever the RAM powers down. This is in contrast to ROM, which is nonvolatile memory, where the contents of memory remain even after the IC has been power cycled. In order to retain the contents of RAM, power must be maintained on the chip at all times. This requires a battery back up to the normal power supply. If the battery back up fails when the power supply is de-energized the contents of RAM will be lost. For this reason RAM is not used for embedded code and is used only for dynamic memory. RAM used for embedded code would be susceptible to loss of battery power and power supply glitches. Furthermore, if RAM were used for embedded code, battery operated devices such as cellular telephones would have diminished battery life due to the constant power requirements of the RAM. When RAM is used for dynamic memory the system does not care if the contents are lost after a power cycle. This alleviates the need for battery back up. However, the cost of RAM is higher than the cost of ROM.

Another storage alternative is sectored EEPROM commonly referred to as FLASH memory. Sectored EEPROM is a nonvolatile storage device that allows read and write on a byte basis. Unlike RAM, in sectored EEPROM an erase operation must be performed before rewriting over a previously written byte. However, data erasure cannot be performed on a byte basis. Erasure can only be performed on a sector basis, where the size of the sector is defined by the particular memory device chosen. The size of an erasable sector is always larger than one byte and can be on the order of 64 Kbytes. However, the number of erase cycles is not unlimited, but is bounded by a maximum cycle life. A typical recommended erase cycle life for sectored EEPROM is 100,000 cycles. Therefore, one would not use sectored EEPROM for applications requiring greater than 100,000 erase cycles over the anticipated device lifetime. Sectored EEPROM has advantages over the other types of rewriteable memory in applications that require fewer than 100,000 erase and rewrite cycles. Sectored EEPROM is preferred over any type of RAM for embedded code applications because sectored EEPROM is nonvolatile. Sectored EEPROM is preferable over EPROM because of sectored EEPROM's ability to rewrite portions of memory in circuit. Sectored EEPROM also does not require the UV light for chip erasure. Sectored EEPROM is preferable over conventional EEPROM, which has comparable rewrite limitations, because of the lower cost and higher density of sectored EEPROM devices. Sectored EEPROMs are used in portable electronic devices for the nonvolatile storage of user configurable data.

Data stored in sectored EEPROM is often formatted to conform to a file system. The file format convention is partially driven by the sector sized erase cycle. Data is not memory mapped to a particular location since data in sectored EEPROM cannot be rewritten in place. The additional software overhead results in dramatically increased memory access times. The access time is further increased in multi-tasking systems. Nonvolatile memory access in a multi-tasking system may be preempted by a higher priority task. Preemption requires the lower priority task to wait for the completion of the higher priority task before proceeding. When the software overhead is included in the calculation of access times, the time to access data from sectored EEPROM may be more than 1000 to 10,000 times slower than the access time to data stored in RAM devices.

Long access times present user interface problems. In a portable electronic device such as a wireless phone, nonvolatile user configurable data is often stored in sectored EEPROM. The user interface is enhanced if access to the phone book data appears to occur instantaneously. Data retrieval from sectored EEPROM results in a slow user response when a user enters a phone number to compare against the entries in the phone book. This is due to the software overhead in dealing with the file system that must be initiated in order to retrieve any data from sectored EEPROM. The long access time delay presents a serious problem in real time systems where data retrieval must occur within some predefined window of time.

One solution to the slow access times of sectored EEPROM, or any other nonvolatile memory, is to transfer all data from nonvolatile data records to RAM. The data records could be transferred from nonvolatile RAM upon device power up. Then all the data can quickly be retrieved from RAM. This greatly enhances the user interface. However, this solution presents considerable cost and space disadvantages. Additional RAM is required that redundantly stores the contents of the nonvolatile memory merely to enhance the user interface. What is required is a method and apparatus for reducing the amount of RAM required to maintain a fast user interface when accessing data stored in nonvolatile memory.

SUMMARY OF THE INVENTION

The present invention is a novel and improved method and apparatus for reducing the amount of RAM required to support fast data retrieval from slower non-volatile memory. The use of RAM instead of nonvolatile memory greatly decreases data search time. RAM access is orders of magnitude faster than nonvolatile memory access due to software overhead that must be performed each time nonvolatile memory is accessed.

A collection of data records can be saved in nonvolatile memory. Access to the nonvolatile data records is slowed because of the software overhead associated with nonvolatile memory access. The present invention can be used to greatly enhance searches of data records saved in nonvolatile memory. When data records saved in nonvolatile memory must be searched, numerous accesses to the nonvolatile memory are typically required. The present invention reduces the number of accesses to the nonvolatile data records by saving a series of calculated tag values in predetermined locations in RAM. Searches for data records saved in nonvolatile memory are then performed by searching through the predetermined RAM locations for corresponding tag values then looking up the nonvolatile data record if a matching tag value is found. Searching for matching tag values in RAM reduces to one the typical number of nonvolatile memory accesses required to search for a matching data record. This contrasts with the numerous nonvolatile record retrievals and comparisons required in a conventional search of nonvolatile data records.

A predetermined number of memory locations are allocated in RAM corresponding to the number of data records saved in the nonvolatile memory. Each memory location allocated in RAM need not be large enough to hold the data record saved in nonvolatile memory. In the preferred embodiment two bytes of RAM are allocated for each data record location in nonvolatile memory. The nonvolatile data record may be arbitrarily long. A tag function H(x) is defined to map each nonvolatile record into a corresponding tag value. The tag function H(x) need not provide a 1:1 mapping of data records to tag values. A 1:1 mapping of data records to tag values minimizes the number of nonvolatile memory accesses to one nonvolatile record access per data record search.

The predetermined RAM locations hold tag values determined from contents of the corresponding nonvolatile data records. When a search for a particular data record is required a tag value is calculated for the searched record. If the searched record is designated y, the tag value H(y) is calculated. The tag value H(y) is then compared to all tag values stored in the predetermined RAM locations. This step is performed very quickly due to the fast access capabilities of RAM. If a matching tag value in RAM i s found the corresponding nonvolatile memory location is identified as that location that corresponds to the particular RAM location. The contents of the nonvolatile data record are retrieved and compared to the searched record. I f the two match then the search is complete. If the retrieved nonvolatile memory record and the searched record are not identical matches the remaining tag values in RAM are searched for additional matches to the tag value calculated for the searched record. The search continues until an identical match is found or the end of the RAM tag value s is reached.

The present invention provides an enormous decrease in the amount of time that it takes to search the data records since the majority of the search is performed using the RAM tag tables. The nonvolatile memory records a re only accessed when a tag value match is found. For the majority of the searches only one nonvolatile memory access will be required. The time savings allow for an enhanced user interface while the reduction in RAM provides reduced hardware cost.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Memory and storage devices in any electronic device are allocated according to expected needs. In an electronic device such as a wireless phone memory is typically in the form of nonvolatile memory and RAM. The nonvolatile memory may be a combination of PROM and nonvolatile sectored EEPROM. A type of nonvolatile sectored EEPROM commonly known in the industry is FLASH memory.

One of the advantages in using FLASH memory is its ability to be erased and rewritten electronically. One of the disadvantages of FLASH memory, as discussed earlier, is the inability to update data in place. Whole sectors must be erased at the same time. To maximize efficient use of the FLASH memory space the data saved in FLASH is not memory mapped to a particular location, rather, it is saved using a file based storage system. In contrast, data stored in RAM can be updated in place and because of this can be assigned to a memory map.

Figure 1:
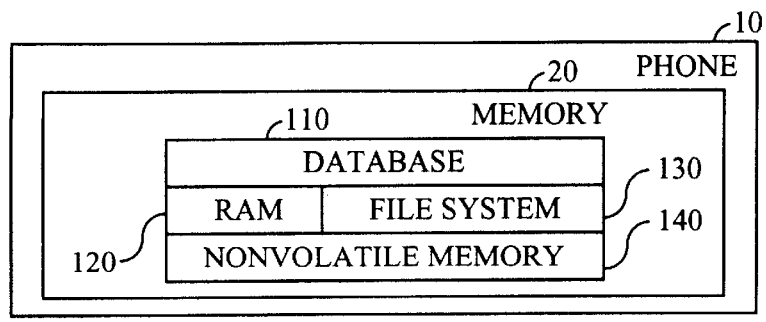
FIG. 1 is a block diagram of a layered memory implementation.

FIG. 1 illustrates a block diagram of the memory 20 structure of an electronic device such as a wireless phone 10. All data saved in memory 20 is managed within a database 110. Data that is volatile or transient in nature is saved in RAM 120. RAM 120 data can be assigned a memory map since RAM 120 data can be updated in place. However, other pieces of data that have varying lengths or locations are managed using a file system 130. The file system 130 is a software routine that determines the format, location, and size of file based data. One of the devices that utilize file based structure for its data is nonvolatile memory 140. All data saved in nonvolatile memory 140 must first be formatted in the file system 130. Layering nonvolatile memory 140 beneath the file system 130 creates further delay in accessing any data saved in nonvolatile memory 140. The delay in accessing data stored in nonvolatile memory 140 can create undesirable delays where data must be retrieved from nonvolatile memory as part of a user interface. An example using data commonly available in a wireless phone is search of a user generated phone book.

Wireless phones typically have the ability to save user generated phone book entries. A user can typically have over one hundred phone numbers and corresponding names in an electronic phone book saved within nonvolatile memory. The actual number of entries is only limited by the amount of memory space a designer is willing to allocate to the phone book. The phone numbers and names each constitute data records that are saved in nonvolatile memory. Each phone number can be up to thirty-two characters long. This length allows for area codes, internal phone extensions, access codes, and personal identification numbers to be automatically dialed for designated numbers. Any number of characters can be allocated for a name but for convenience a thirty-two character length will be assumed. If we assume that 512 combined phone number and name entries are allowed then 16K of nonvolatile memory must be allocated. When a user enters a phone number or name and wishes to search the phone book for the corresponding saved information the data records saved within nonvolatile memory must be searched.

Data records saved in nonvolatile memory can only be read through the file system 130. The file system 130 is a layer beneath the database 110. The multiple layers on top of nonvolatile memory access create a large delay for any access to data records stored in nonvolatile memory. During a conventional search routine a data record is retrieved from nonvolatile memory and compared to the input data. If the two match the data records corresponding to the match are found. If the two do not match the first retrieved data record is discarded and the next data record is retrieved from nonvolatile memory. Retrieval of data records from nonvolatile memory and comparison to the input data is continued until a match is found or all records in the nonvolatile memory are searched. The multiple layers that must be traversed before retrieving data records from nonvolatile memory contribute to delays. When input data must be compared to a large number of contents saved in nonvolatile memory the delay is excessive for a user interface. A user that inputs a name or phone number and wishes to retrieve the stored information relating to that entry cannot be expected to wait for long periods of time. The user interface needs to appear seamless and instantaneous to the user.

One way of increasing the speed associated with searching nonvolatile memory data records is to have the search performed in RAM. Access times to data records saved in RAM are orders of magnitude faster than the access times to retrieve the equivalent data record from nonvolatile memory. The difference in access times is attributable to the file system. RAM does not require data records be formatted and accessed under the file system. In order to perform the search in RAM instead of nonvolatile memory all of the nonvolatile memory data records can be transferred to RAM. Then when a search is required, all of the data records are available in RAM. This implementation has the disadvantage of using a large amount of RAM merely to redundantly store data records available in nonvolatile memory. The increased cost and the physical size of additional RAM make this solution less than ideal for implementation in a portable electronic device such as a wireless phone.

Figure 2A:
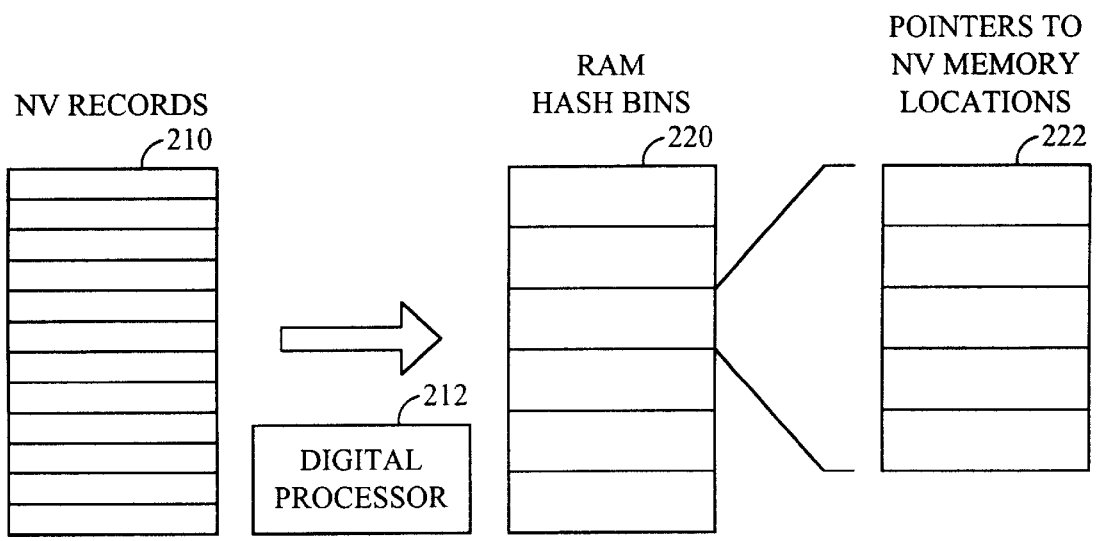
FIGS. 2A–2B are block diagrams showing implementations of RAM based look up of NV memory tables.

One alternative implementation that improves search times of data records stored in nonvolatile memory but does not entail saving the entire nonvolatile memory contents in RAM is illustrated in FIG. 2A. In FIG. 2A RAM is not used to hold the data records saved in nonvolatile memory. Instead, RAM hash bins 220 are defined in RAM. Each of the original nonvolatile (NV) records 210 is input to a hash function. A pointer to the input NV record 210 is stored in the RAM hash bin 220 corresponding to the output hash number. The hash function does not need to provide a 1:1 mapping of NV record 210 to RAM hash bin 220. However, the choice of a hash function trades off the number of RAM hash bins 220 against access speed. The more unique the hash function mapping the larger the required space for the RAM hash bin 220. The advantage in unique hash function mapping is the reduced number of accesses to nonvolatile memory when searching the NV records 210 for a match.

The implementation shown in FIG. 2A performs as follows. Upon initialization of the electronic device each of the NV records 210 is input to a hash function. Initialization could be defined as any event for an electronic device. Initialization in a wireless phone is defined as power up. An example of a hash function is shown below.

$$y_N = \left(\sum_{i=1}^{N} 5(y_{i-1}) + x_i\right) / (65521)$$

In the equation $x_i$ represent the ith byte in the particular NV data record input to the hash function. The $y_i$ represent the output of the hash function after processing i bytes in the particular NV data record. The number N represents the number of bytes comprising each NV data record entry. Each NV data record is thirty-two bytes long in the example described above. For the data record length described in the above example N=32. The calculation is performed using integer math for an actual implementation. It can be seen that the mapping from input to output is not 1:1 when integer math is used.

The hash function output falls within a defined RAM hash bin 220. A pointer 222 to the NV record that was used as the input to the hash function is saved in the RAM hash bin 220. The pointer uses less memory space to store than does the data record. Typically, four bytes are allocated to the pointer. For a nonvolatile data record having 512 entries 2K of memory is required to house all of the pointers. This provides a possible conservation of RAM memory space.

Each hash bin must have the ability to save more than one pointer 222. This is necessary since the hash function does not provide a 1:1 mapping of input to output. The lack of a 1:1 mapping in the hash function creates problems with RAM memory allocation. A large number of hash bins need to be defined in order to ensure that each hash bin will likely have only one pointer. If a fewer number of hash bins are defined there is likelihood that each hash bin will need to store a number of pointers.

A designer could ensure that each hash bin only has one pointer within it if 64K of hash bins are defined. Since only 2K of pointers are required to identify all of the data records it is evident that the majority of hash bins will contain null pointers. Allocating 64K hash bins clearly requires a greater amount of RAM space than does loading all of the nonvolatile data records into RAM. Therefore this solution is not viable. To reduce the RAM requirement a design allocates less 64K hash bins. However, a reduction in the number of hash bins necessarily increases the probability that any one hash bin will contain more than one pointer value.

In order to find a data record match to some input data, the input data is first passed through the hash function. The output of the hash function then directs the search routine to a specific hash bin. If no pointer is stored in the hash bin then there is no match to be found in the nonvolatile data records. This greatly reduces the search time if there is no match to be found. In the conventional search all the data records in nonvolatile memory would need to be retrieved and compared against the input before determining that no match existed. Using the hash bin method accesses to nonvolatile memory do not need to occur prior to determining that no matches exist.

If there are pointers stored in the hash bin the first pointer is retrieved from the hash bin and the NV record that the pointer refers to is retrieved. Then a full comparison is performed between the input and the retrieved data record. If the two are identical a match is found and the remaining associated data records can be retrieved. If the retrieved data record does not match then the next pointer, if any, in the hash bin must be retrieved. The comparison is performed and retrieval of pointers from the hash bin is repeated until either a match is found or there has been a comparison of all of the nonvolatile data records referred to by the hash bin pointers.

In the previous implementation there is the possibility of numerous accesses to nonvolatile memory. The number of accesses to nonvolatile memory depends on the number of pointers stored in each hash bin. The number of hash bins required is related to the hash function. Increasing the number of unique hash bins reduces the number of nonvolatile memory accesses. The reduction in the number of nonvolatile memory accesses comes at a cost of increased RAM required.

Figure 2B:
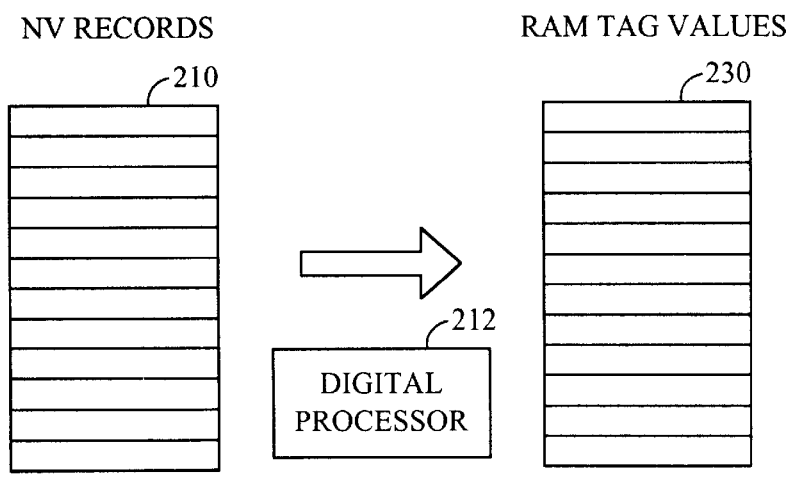

The present invention utilizes an implementation that provides reduced data record search times and decreased RAM requirements. A block diagram of the present invention is shown in FIG. 2B. In the present invention NV records 210 comprise a collection of data records as previously described. However, instead of defining hash bins in RAM a block of memory is allocated in RAM for tag values 230. As described in the earlier example, each data record saved in nonvolatile memory is thirty-two characters long. There are 512 available records allocated in nonvolatile memory. This corresponds to 16K of memory. The present invention allocates two bytes of RAM space for each data record in nonvolatile memory. To accommodate 512 data records 1K bytes of RAM needs to be allocated. Since the number of bytes of RAM allocated to each nonvolatile memory record is constant the RAM address locations can be assigned to corresponding nonvolatile data records. As an example, the first nonvolatile data record would correspond to the first two bytes allocated in RAM.

The two bytes of RAM allocated to each nonvolatile data record are not sufficient to hold the entire data record. Instead, the two bytes hold a tag value corresponding to the data record. The tag value is generated using the same hash function described above. The tag value corresponding to each data record in nonvolatile memory is calculated and saved in a predetermined location in RAM. The present invention therefore minimizes the amount of RAM allocated. Two bytes in RAM are allocated for each nonvolatile data record and there are 512 data records. Therefore only 1K of RAM needs to be allocated.

When an input value needs to be compared to the contents of the nonvolatile memory data records the input value is first passed through the hash function. Then the output hash value is compared against the tag values saved in RAM. When a matching tag value is located the contents of nonvolatile memory corresponding to that tag value location is retrieved and compared against the original input value. If the two are identical then a match is found. Otherwise, the search continues down the RAM tag values until either another tag value produces a matching data record or the end of the tag value list is reached. In this manner the majority of the search is performed in RAM and the only time nonvolatile memory is accessed is when the calculated input tag value matches one of the previously saved tag values. If the hash function does not produce a large number of duplicate tag values, the number of accesses to nonvolatile memory is minimized. Using the hash function previously described, the number of accesses to nonvolatile memory is minimized to one for 99% of data searches.

Figure 3A:
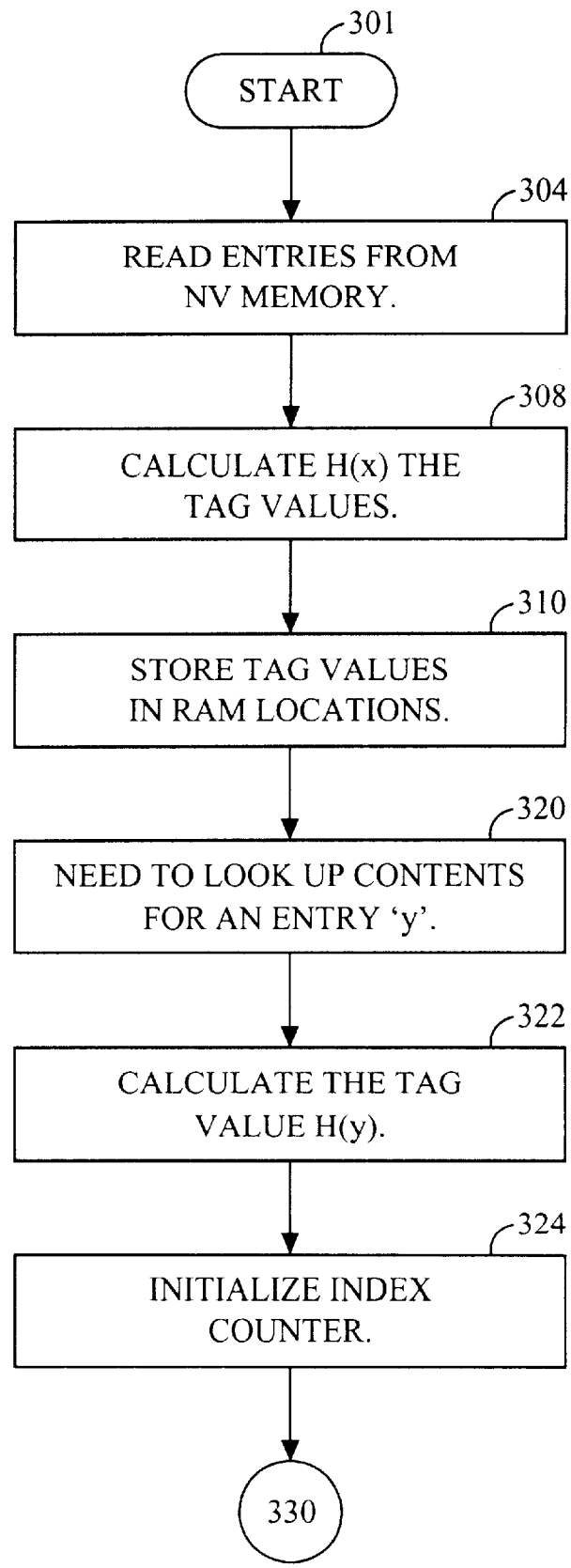
FIGS. 3A–3B are flow charts of the RAM implementation of the present invention.

FIG. 3A shows a flow chart of the present invention. The routine starts at state 301. The routine is initialized anytime the device is turned powered up. In a wireless phone, whenever the user powers up the phone the routine starts 301. The routine next proceeds to state 304 where all of the entries in the nonvolatile (NV) memory data records are read. Next at state 308 the tag values for the NV memory entries are calculated. The tag value for each NV memory entry is calculated using a function such as the hash function previously described. Each tag value requires two bytes.

The routine then proceeds to state 310 where the calculated tag values are stored in predetermined RAM locations. Each RAM location corresponds to an entry in the NV memory data record collection. As an example, the sixth entry in the RAM tag value table is an absolute address that corresponds to the sixth entry in the NV memory data record regardless of where in NV memory the entry actually resides.

After the tag values have been saved in RAM any search of the data records can be performed primarily in RAM. State 320 assumes an entry 'y' needs to be compared to the contents of the data records. In an electronic device such as a wireless phone the entry 'y' could correspond to a phone number input by the user. The data record contents correspond to names and information associated with a particular phone number. A user may input a phone number and wish to retrieve all previously stored information relating to that number.

The first step of the search is accomplished in state 322 where the tag value corresponding to the input 'y' is calculated. At state 324 an index counter used in the search is initialized. The flow chart next proceeds to point 330. Point 330 is not a functional element of the flow chart and is merely included to link the states of the flow chart of FIG. 3A to the states of the flow chart of FIG. 3B.

Figure 3B:
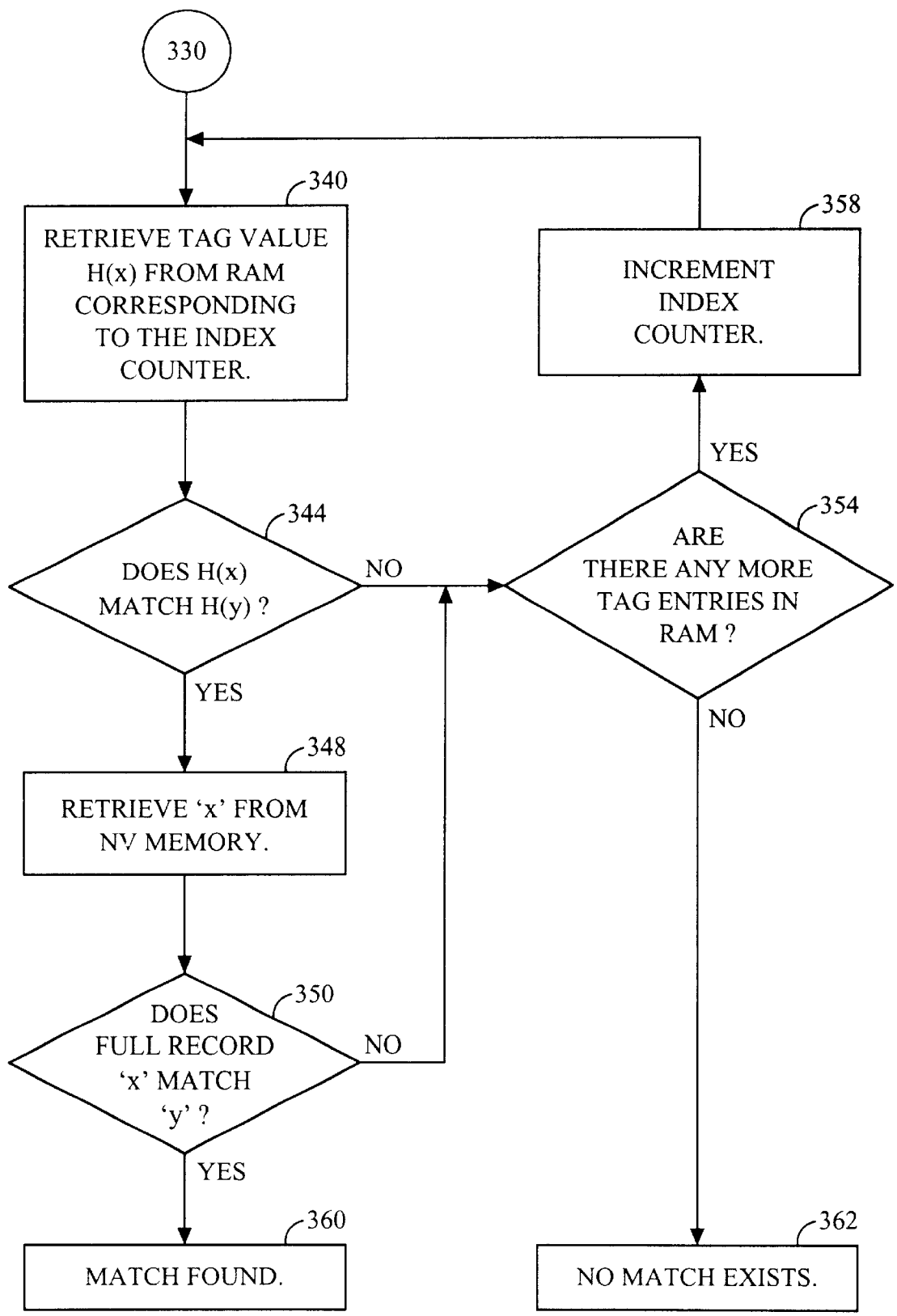

FIG. 3B begins with point 330 that links the flow chart of FIG. 3A to that of FIG. 3B. From point 330 the routine proceeds to state 340. At state 340 the routine retrieves from RAM the previously saved tag value corresponding to the location identified by the index counter. The routine next proceeds to state 344 where the tag value corresponding to the entry 'y' is compared to the retrieved RAM tag value. The retrieval and comparison operation occurs very quickly since the tag values are only two bytes long and all values reside in RAM. If the routine determines that the two tag values do not match the routine proceeds to state 354 to check to see if there are any more tag entries in RAM that have yet to be compared to the input tag value. If at state 354 the routine identifies more tag values in RAM that have not been compared the routine proceeds to state 358 to increment the index counter. After the index counter is incremented the routine loops back to state 340 to retrieve the next tag value identified by the index counter.

If instead, at state 354 the routine determines that there are no further tag values in RAM that have not been compared to the entry tag value the routine proceeds to state 362 where the routine concludes that no data record exists in memory that matches the input entry. The routine is then finished. Where no tag values match the tag value for the input entry there necessarily is no data record stored in nonvolatile memory that matches the input entry. In the present invention there is no access to nonvolatile memory for this condition. Thus, the search is able to determine that no nonvolatile data records match without ever accessing the nonvolatile memory.

If at state 344 the routine instead determines that the retrieved tag value matches the input entry tag value the routine proceeds to state 348. At state 348 the routine retrieves from nonvolatile memory the data record that corresponds to the matching tag value previously retrieved from RAM. Thus, the data records saved in nonvolatile memory are only accessed if the tag value for that data record matches the tag value of an input entry.

Once the actual data record is retrieved form nonvolatile memory the routine proceeds to state 350 to perform a comparison of the full records. The comparison of the full records is required because the hash function does not provide a 1:1 mapping from data record to tag value. Although the input entry and the nonvolatile data record may generate the same tag values the actual data records must be compared to actually confirm a match.

If the retrieved nonvolatile memory data record matches the input entry a successful search has been performed. There is no further reason to continue the search routine so the routine ends and awaits a new input entry to search.

If at state 350 the routine determines that the retrieved nonvolatile memory data record does not match the input entry the routine proceeds to state 354 as described above to determine whether or not all RAM tag values have been searched.

The flow charts in FIGS. 3A and 3B illustrate how a minimal amount of RAM can be utilized to aid in fast search of data records stored in slow nonvolatile memory. Rather than loading the entire contents of the nonvolatile memory data records into RAM only a set of tag values are loaded into RAM. When the data records need to be searched for an input entry first the input entry is used to generate a tag value using the same hash function previously used to generate the tag values saved in RAM. Then the input entry tag value is successively compared against the tag values saved in RAM. If a matching tag value is found the corresponding data record is retrieved from nonvolatile memory. Therefore nonvolatile memory is only accessed when there is a high probability of retrieving a matching data record. The data record retrieved from nonvolatile memory is then compared against the input entry. There is a high likelihood of obtaining a match since the two records generate the same tag value. However, if the retrieved data record and the input entry do not match, the remainder of the RAM tag value table is searched for any other tag values that match the input entry tag value. Because the hash function provides nearly a 1:1 mapping of input to tag value nonvolatile memory is typically only accessed once per search. Therefore the number of accesses to nonvolatile memory is minimized while minimizing the amount of RAM required to implement the invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus for fast data access that minimizes the required amount of fast memory comprising:
   a first memory for storage of a plurality of data records that define a collection of data records;
   a digital processor; and
   a second memory for storage of tag values calculated by the digital processor corresponding to each of the data records stored in the first memory;

wherein the digital processor, in response to a request to search the collection of data records for an input entry, computes an input entry tag value corresponding to the input entry, compares the input entry tag value to each of the tag values stored in the second memory, retrieves the data record corresponding to the tag value that matches the input entry tag value, and compares the input entry to the retrieved data record.

2. The apparatus of claim 1 wherein the first memory is nonvolatile memory.

3. The apparatus of claim 1 wherein the second memory is RAM.

4. The apparatus of claim 1 wherein the data records comprise entries in an electronic phone book.

5. The apparatus of claim 1 wherein the tag values are calculated as the outputs of a hash function using the data records as inputs to the hash function.

6. The apparatus of claim 5 wherein the input entry tag value is calculated using the same hash function as was used for the calculation of the tag values.

7. The apparatus of claim 1 wherein two bytes are allocated in the second memory for each data record stored in the first memory.

8. A phone configured for fast data access with reduced RAM requirements comprising:

a first memory for storage of a plurality of data records that define a collection of data records;

a digital processor; and a second memory for storage of tag values calculated by the digital processor corresponding to each of the data records stored in the first memory;

wherein the digital processor, in response to a request to search the collection of data records for an input entry, computes an input entry tag value corresponding to the input entry, compares the input entry tag value to each of the tag values stored in the second memory, retrieves the data record corresponding to the tag value that matches the input entry tag value, and compares the input entry to the retrieved data record.

9. The phone of claim 8 wherein the collection of data records is an electronic phone book.

10. The phone of claim 8 wherein the first memory is nonvolatile memory.

11. The phone of claim 8 wherein the second memory is RAM.

12. The phone of claim 8 wherein the tag values are calculated as the outputs of a hash function using the data records as inputs to the hash function.

13. The phone of claim 12 wherein the input entry tag value is calculated using the same hash function as was used for the calculation of the tag values.

* * * * *